Patented June 5, 1928.

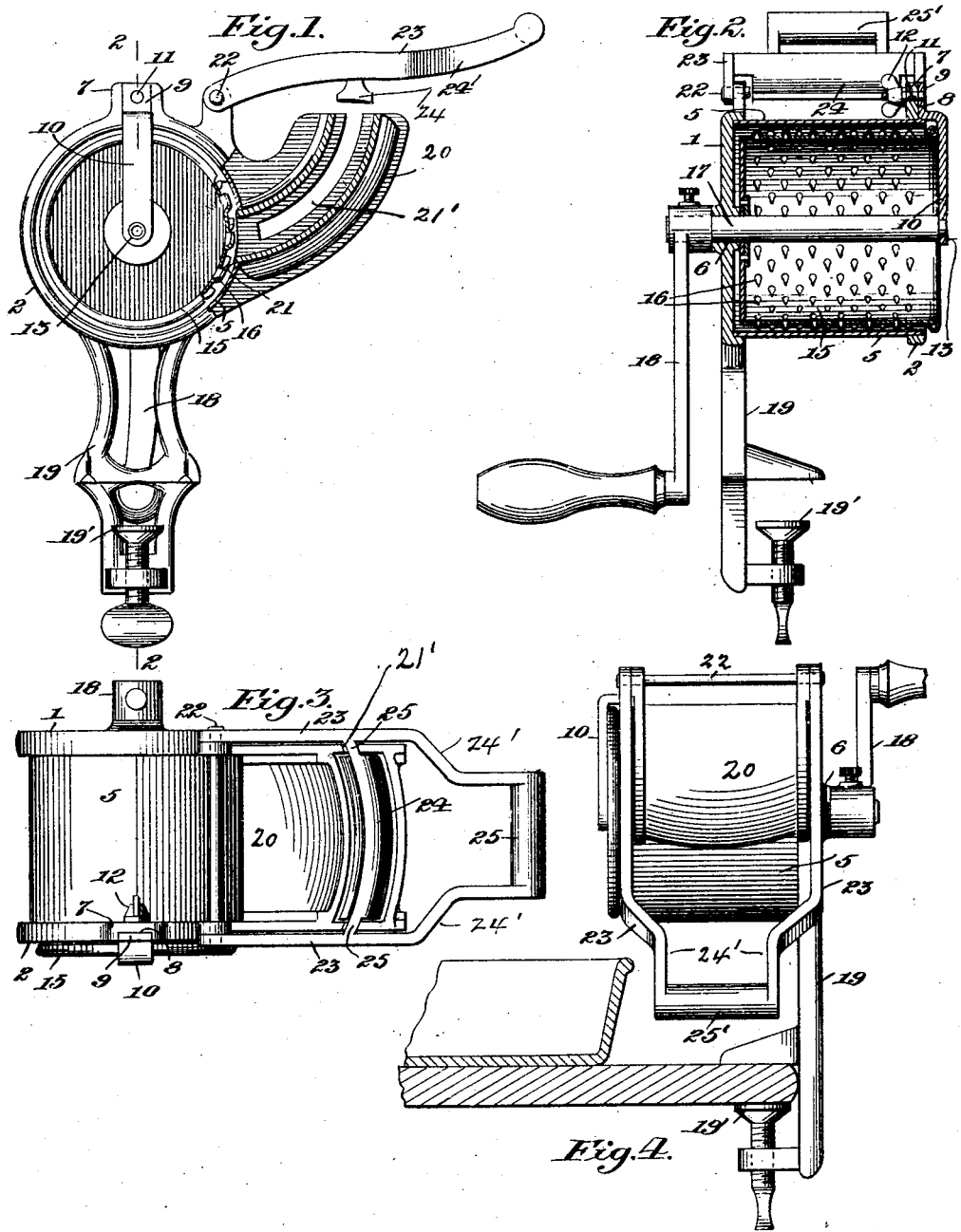

1,672,391

UNITED STATES PATENT OFFICE.

LEVIN HILL MULLIKIN, OF EASTON, MARYLAND.

ROTARY GRATER.

Application filed May 17, 1927. Serial No. 192,017.

My invention relates to rotary graters. The object of the invention is to provide a rotary grater especially adapted to grate the curved broken pieces of coconut endwise of the pieces instead of flatwise as heretofore.

The invention consists in providing a rotary grater with a hopper curved outwardly and upwardly from one side of the grater and shaped internally to receive and guide broken pieces of coconut endwise and guide them to the rotary grater: to provide a lever pivoted concentrically to the curved hopper and having a presser bar between its ends fitting within the curved hopper to force the coconut towards the rotary grater: also to provide the lever with two parallel arms to which the ends of the presser bar are secured and to provide the sides of the hopper with curved slots in which the ends of the presser bar work: also to provide the lever beyond the presser bar with inturned ends and form it in a single piece with its handle portion and presser bar.

These objects I accomplish by the construction shown in the accompanying drawing, in which:—

Figure 1 is a sectional side elevation.
Figure 2 is a section on line 2, 2, Figure 1.
Figure 3 is a plan, and
Figure 4 is an end elevation showing the machine in position for use.

The frame of the machine comprises parallel circular end pieces 1 and 2 from which project the curved hopper 20. The end piece 1 is in the form of a disk recessed on its inner face to receive one end of the cylindrical casing 5, and provided with a central shaft bearing 6, while the other end piece 2 is in the form of a ring which receives the open end of the cylindrical casing 5. This ring 2 is provided with an upstanding apertured lug 7, having a recess 8 in its outer face which receives the inturned end 9 of a bearing arm 10; a bolt 11 and thumb screw 12 serving to hold the arm 10 in place. The free end of the arm 10 is provided with a bearing aperture 13 in horizontal alignment with the shaft bearing 6. The cylindrical grater 15 is closed at its end next to the end piece 1 and open at the opposite end so as to discharge therefrom the grated material entering the grater through its curved outwardly projecting teeth 16. The closed end of the grating cylinder 15 carries the shaft 17 mounted at one end in the shaft bearing 6 and at its opposite end mounted in the aperture 13 which prevents all sagging of the grater and shaft when in operation. The shaft 17 projects beyond the end piece 1 and receives an operating handle 18 or other operating means.

Depending from the end piece 1 is the usual attaching arm 19 and its clamp 19'. The hopper 20 curves outwardly and upwardly from the end pieces 1 and 2 and its inner open end registers with a transverse opening 21 in the cylindrical casing 5 so as to present the pieces to be grated, endwise to the grating cylinder 15.

The curvature of the hopper 20 corresponds to the natural curvature and thickness of the broken pieces of coconut so that they will be held from turning over in the hopper and always be presented endwise to the grater. The hopper is therefore of extended width, comparatively narrow and curved both longitudinally and transversely. The ends of the hopper 20 are provided with curved slots 21'—21' concentric with the axis 22 of a pair of lever arms 23 having an integral presser bar 24 connecting them in a rigid manner and guided at its narrowed ends 25 in the slots 21'. The outer ends of the lever arms 23 are offset inwardly as at 24' and connected by an integral handle member 25'. In other words the lever arms 23, presser bar 24 and handle 25' are cast in a single piece. The inward offsets allow the pan which receives the discharge from the grater to be placed further under the grater than would be the case were the arms unprovided with these offsets 24.

The machine may be readily taken apart for cleaning by simply removing the handle and then backing off the thumb nut to allow the bearing arm 10 to be moved from the shaft whereupon the grating cylinder and shaft may be removed.

I am aware that cylindrical graters having hoppers and lever carried presser bars are old, but I do believe that I am the first to so shape the hopper as to hold the curved piece of coconut in proper position to present its end to the grater, which is a great improvement over presenting the piece flatwise, as this latter method causes the meat to gum up the grating teeth and prevent proper grating, whereas by my endwise presentation of the piece the teeth of the grater are kept practically clear and the grating is therefore more efficiently performed.

While designed specifically for grating coconut the machine will be found useful in grating other substances, but with my invention the housewife may readily prepare freshly ground coconut and not be restricted to using the dried packaged product.

Having described the invention what I claim is:

1. A grater provided with a feed hopper having its feed passage curved and dimensioned to receive and hold flatwise, broken pieces of coconut and present the same endwise to the grater proper; the sides of the hopper being provided with curved slots, a lever pivoted concentrically to the hopper and having parallel side bars exterior to the side of the hopper, an intermediate pressure bar connecting the side bars, working in the hopper and having its ends guided in the curved slots and a handle bar connecting the ends of the side bars.

2. A grater provided with a feed hopper having its feed passage curved and dimensioned to receive and hold flatwise, broken pieces of coconut and present the same endwise to the grater proper; the sides of the hopper being provided with curved slots, a lever pivoted concentrically to the hopper and having parallel side bars exterior to the sides of the hopper, a pressure bar connecting the side bars between their ends and guided at its ends in said curved slots; the free ends of the side bars being offset inwardly and a handle bar rigidly connecting said offset ends.

3. A grater comprising side members, one of which is closed and the other an open ring, a cylindrical casing mounted in the said members and having an inlet opening at one side, a grater cylinder having a central shaft mounted at one end in said closed member and there provided with an operating handle, a movable shaft support for the opposite ends of the shaft and supported from the open ring, a feed hopper projecting from the said side members integrally therewith; said hopper having a curved feed passage leading to the casing inlet and dimensioned to receive and guide flatwise, broken curved pieces of coconut, endwise to said inlet, a lever swinging concentrically to the feed passage and having a pressure bar working therein.

In testimony whereof I affix my signature.

LEVIN H. MULLIKIN.